(12) United States Patent
Blohm

(10) Patent No.: US 7,734,697 B2
(45) Date of Patent: Jun. 8, 2010

(54) SYSTEM AND METHOD FOR PRESENCE ENABLED ELECTRONIC MAIL FOLDERS

(75) Inventor: Jeffrey M. Blohm, Portola Valley, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 679 days.

(21) Appl. No.: 10/255,908

(22) Filed: Sep. 26, 2002

(65) Prior Publication Data

US 2004/0073614 A1 Apr. 15, 2004

(51) Int. Cl.
*G06F 15/16* (2006.01)
*G06F 7/04* (2006.01)

(52) U.S. Cl. ............................ 709/206; 709/227; 726/4

(58) Field of Classification Search ................. 709/206, 709/203–204, 219, 227–230; 726/4; 379/93.24
See application file for complete search history.

(56) References Cited

U.S. PATENT DOCUMENTS 6,549,937 B1 * 4/2003 Auerbach et al. ........... 709/206

FOREIGN PATENT DOCUMENTS

WO         WO 0145342 A  *  6/2001

* cited by examiner

*Primary Examiner*—Peling A Shaw

(57) ABSTRACT

A telecommunications system includes a plurality of network clients including electronic or multimedia messaging clients. The electronic messaging clients are adapted to provide presence information and to display such presence information in association with received messages. The display of messages may then be sorted according to the presence information.

19 Claims, 5 Drawing Sheets

| SENDER | DATE | SIZE | SUBJECT |
|---|---|---|---|
| MICROSOFT | 04/16 | 23k | WINDOWS PLATFORM NEWS |
| JOHN DOE | 04/16 | 2k | LUNCH? |
| SANDY SMITH | 04/15 | 4k | PERFORMANCE REVIEW |
| CORPORATE SALES | 04/10 | 17k | EMPLOYEE PURCHASE PROGRAM |
| ABC COMPANY | 04/07 | 5k | IRA NEWS |
| SANDY SMITH | 04/06 | 1k | GROUP MEETING |

*FIG. 5*

| SENDER | PRESENCE | DATE | SIZE | SUBJECT |
|---|---|---|---|---|
| MICROSOFT | | 04/16 | 23k | WINDOWS PLATFORM NEWS |
| JOHN DOE | ON PHONE | 04/16 | 2k | LUNCH? |
| SANDY SMITH | AVAILABLE | 04/15 | 4k | PERFORMANCE REVIEW |
| CORPORATE SALES | | 04/10 | 17k | EMPLOYEE PURCHASE PROGRAM |
| BRUCE WU | | 04/09 | 3k | PROJECT STATUS |
| ABC COMPANY | | 04/07 | 5k | IRA NEWS |
| SANDY SMITH | AVAILABLE | 04/06 | 1k | GROUP MEETING |

*FIG. 6*

| SENDER | PRESENCE | DATE | SIZE | SUBJECT |
|---|---|---|---|---|
| SANDY SMITH | AVAILABLE | 04/15 | 4k | PERFORMANCE REVIEW |
| SANDY SMITH | AVAILABLE | 04/06 | 1k | GROUP MEETING |
| JOHN DOE | ON PHONE | 04/16 | 2k | LUNCH? |
| BRUCE WU | | 04/09 | 3k | PROJECT STATUS |
| MICROSOFT | | 04/16 | 23k | WINDOWS PLATFORM NEWS |
| CORPORATE SALES | | 04/10 | 17k | EMPLOYEE PURCHASE PROGRAM |
| ABC COMPANY | | 04/07 | 5k | IRA NEWS |

*FIG. 7*

| SENDER | PRESENCE | DATE | SIZE | SUBJECT |
|---|---|---|---|---|
| SANDY SMITH | AVAILABLE | 04/15 | 4k | PERFORMANCE REVIEW |
| SANDY SMITH | | 04/06 | 1k | GROUP MEETING |
| JOHN DOE | ON PHONE | 04/16 | 2k | LUNCH? |
| BRUCE WU | | 04/09 | 3k | PROJECT STATUS |
| MICROSOFT | | 04/16 | 23k | WINDOWS PLATFORM NEWS |
| CORPORATE SALES | | 04/10 | 17k | EMPLOYEE PURCHASE PROGRAM |
| ABC COMPANY | | 04/07 | 5k | IRA NEWS |

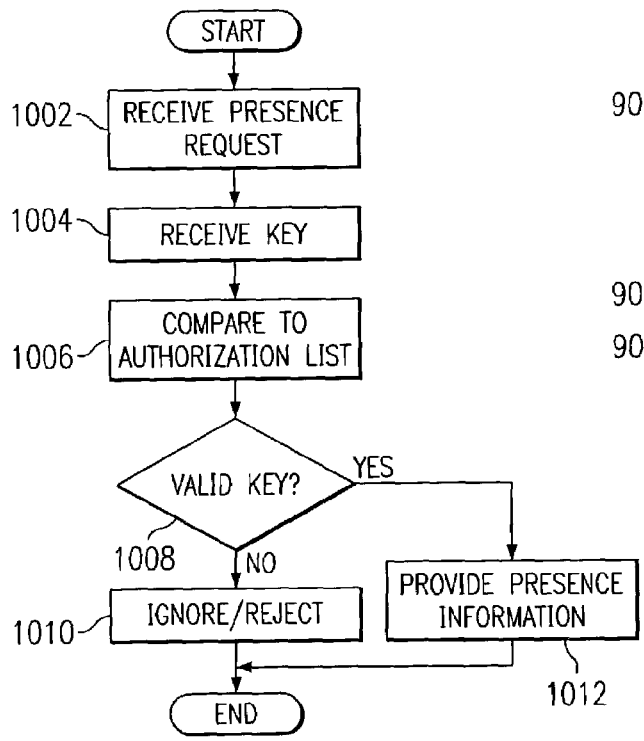
FIG. 10
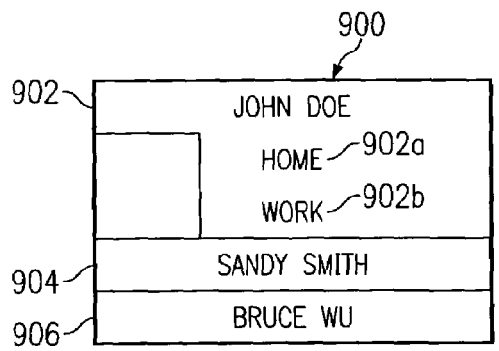
FIG. 11A
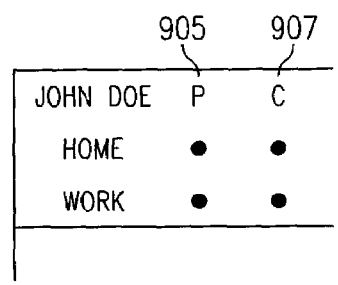
FIG. 11B
| | SENDER | PRESENCE | DATE | SIZE | SUBJECT |
|---|---|---|---|---|---|
| 1010 { | SANDY SMITH | AVAILABLE | | | |
| | SANDY SMITH | AVAILABLE | | | |
| 1014 | JOHN DOE-HOME | AVAILABLE | | | |
| 1015 | JOHN DOE-HOME | AVAILABLE | | | |
| 1016 | JOHN DOE-WORK | AVAILABLE | | | |
| 1012 | BRUCE WU | IN MEETING | | | |
Columns: 1002 SENDER, 1003 PRESENCE, 1004 DATE, 1006 SIZE, 1008 SUBJECT
FIG. 11C  950

SYSTEM AND METHOD FOR PRESENCE ENABLED ELECTRONIC MAIL FOLDERS

FIELD OF THE INVENTION

The present invention relates to telecommunications systems and, in particular, to an improved system and method for handling electronic mail.

BACKGROUND OF THE INVENTION

Electronic mail, or electronic messaging, is rapidly becoming an essential business tool and preferred method for communicating. An electronic messaging message typically includes a "body" such as a text or HTML message with one or more attachments and is typically accompanied by displayable header information. Such header information can include parameters such as "From," "To," "Subject," "Date and Time Received," "Size," "Priority," and the like, and allows the user to sort the messages in his mailbox.

Electronic mail can be disadvantageous when a recipient wishes to respond to a sender and when instantaneous feedback of a sender's presence is desired. For example, a recipient may receive an urgent electronic messaging from a sender and wish to reply. However, if the recipient replies, there is no way to ensure that the original sender is available to receive the message. While systems are known in which the sender is notified when a recipient opens the mail, these provide only after-the-fact recipient status.

As such, there is a need for a more efficient way to process electronic mail. There is a still further need for an electronic mail system that advises a recipient of an electronic messaging of a sender's presence status.

SUMMARY OF THE INVENTION

These and other drawbacks in the prior art are overcome in large part by a system and method according to embodiments of the present invention.

A telecommunications system according to an embodiment of the present invention includes a plurality of network clients including electronic messaging clients. The electronic messaging clients are adapted to provide presence information to other electronic messaging clients via a presence server, accessed when a mailbox is accessed, and to display such presence information in association with received messages. The display of messages may then be sorted according to the presence information.

An electronic messaging client according to an embodiment of the present invention includes a messaging module, a user interface module, and a presence module. The presence module includes a Sorting Criteria Module that allows the user to set presence criteria and the way in which the criteria will be displayed by the user interface module. The Presence Information Module allows a sender to program in his presence information or, in certain embodiments, automatically provides such information based on network usage, such as telephone use.

An electronic messaging system according to an embodiment of the present invention employs a buddy list of those for whom presence information is to be provided to a receiving party. The receiving party's inbox can then be organized according to presence factors and the buddy list. In addition, in certain embodiments, new parties can be added to the buddy list by sending a subscription request to the sender or a presence server. The sender or presence server can then respond with the presence information.

A better understanding of these and other specific embodiments of the invention is obtained when the following detailed description is considered in conjunction with the following drawings.

BRIEF DESCRIPTION OF THE DRAWINGS

FIG. 5 is a diagram of an exemplary inbox screen according to an embodiment of the present invention;

FIG. 6 is a diagram of an exemplary inbox screen according to an embodiment of the present invention;

FIG. 7 is a diagram of an exemplary inbox screen according to an embodiment of the present invention;

FIG. 10 illustrates operation of an embodiment of the present invention; and

FIGS. 11A-11-C illustrate operation of an embodiment of the present invention.

DETAILED DESCRIPTION OF EMBODIMENTS OF THE INVENTION

Figure 1:
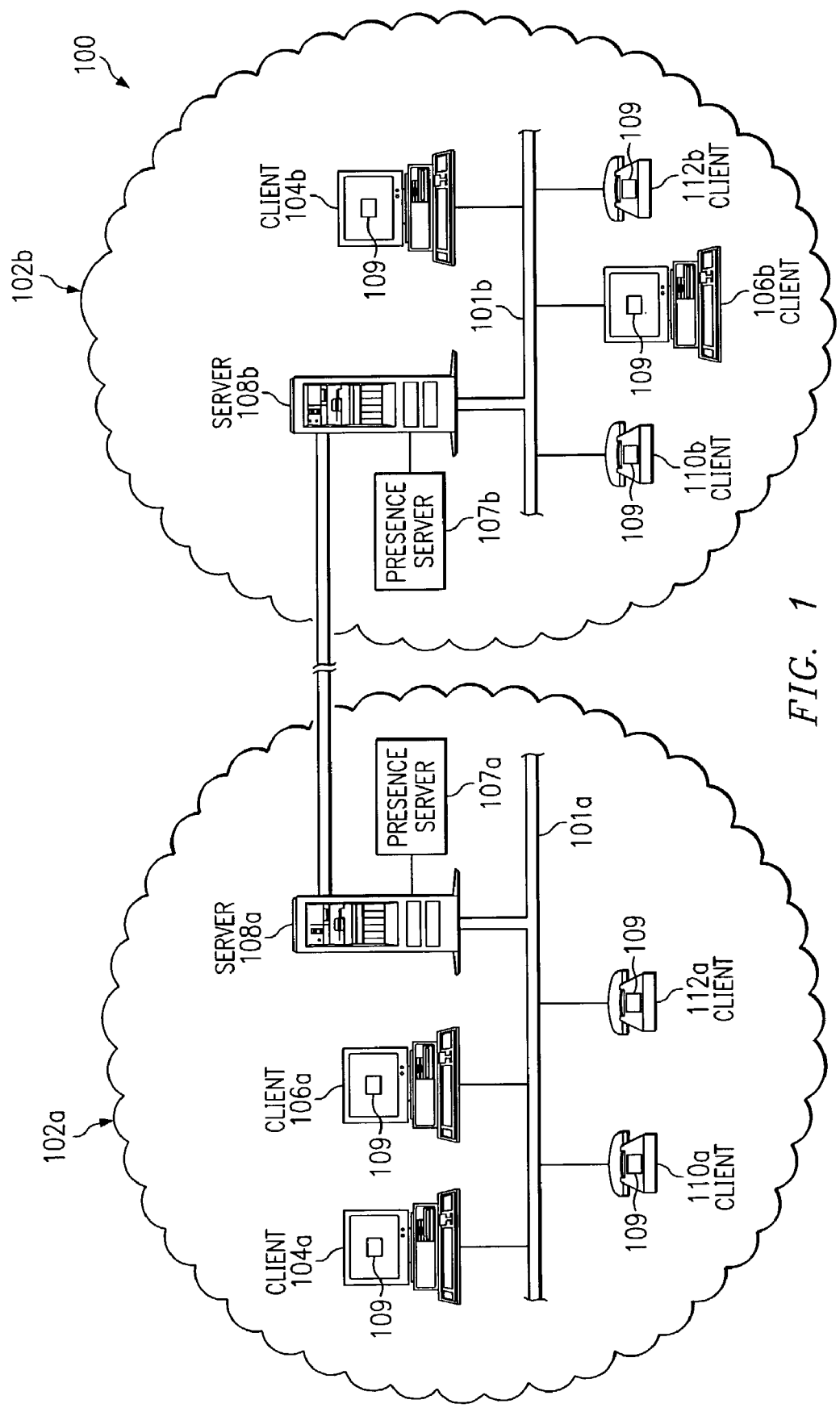
FIG. 1 is a diagram of a telecommunication system according to an embodiment of the present invention.

Turning now to the drawings and, with particular attention to FIG. 1, a diagram of a telecommunications system 100 according to an embodiment of the present invention is shown.

In particular, shown are a plurality of linked systems 102a, 102b which may be embodied as packet data networks or multimedia networks. In one embodiment, one or more of the networks 102a, 102b may be implemented as a voice or multimedia over IP network, such as an H.323 telecommunications system, or a system employing MGCP (Media Gateway Control Protocol), SIP, SGCP, MEGACO, or similar protocols. It is noted that, while a plurality of local area network systems are shown, the invention is equally applicable to a single network employing a local electronic messaging system. Further, the invention is applicable to computers or other devices coupled via the Internet or distributed Intranets. Thus, the figures are exemplary only.

Returning to FIG. 1, network 102a includes local area network 101a, coupled to which may be a plurality of network clients 104a, 106a, 110a, 112a. As will be explained in greater detail below, the network clients 104a, 106a, 110a, 112a may include electronic or multimedia messaging clients 109 according to embodiments of the present invention. The network 101a may be embodied as a wired or wireless network. As shown, network clients 104a, 106a may be embodied as personal computers including electronic messaging clients and may also include IP telephony capabilities. The network clients 110a, 112a may be embodied as IP telephony devices, and may include messaging capabilities according to embodiments of the present invention. Also coupled to the network 101a may be a server 108a. The server 108a may be embodied as a variety of devices, including an H.323 gatekeeper or gateway (or SIP gateway or border proxy) and, as shown, may couple the network to one or more other systems 102b. In addition, as will be explained in greater detail below, a presence server 107a may couple to or be embodied in the server 108a. The presence server 107a receives presence information from an electronic messaging sender and then can be accessed by a registered recipient.

The system 102b is generally similar to system 102a, and includes network clients 104b, 106b, 110b, and 112b, as well as a server 108b. As in system 102a, the network clients 104b, 106b may be embodied as personal computers, while network clients 110b, 112b may be IP telephony devices. As in system 102a, one or more of the network clients 104b, 106b, 110b, 112b may be provided with electronic or multimedia messaging clients according to embodiments of the present invention. Finally, a presence server 107b may be provided.

More particularly, the electronic messaging clients 109 may be equipped with presence capabilities according to embodiments of the present invention. In the case of a personal computer-equipped client, for example, the presence client allows the user to set one or more presence or availability parameters which are then transmitted to its associated presence server. When the recipient receives an electronic messaging message, the recipient can access the presence server. The recipient can then display the resulting list of messages with the presence information and sort messages according to presence indicia.

Figure 2:
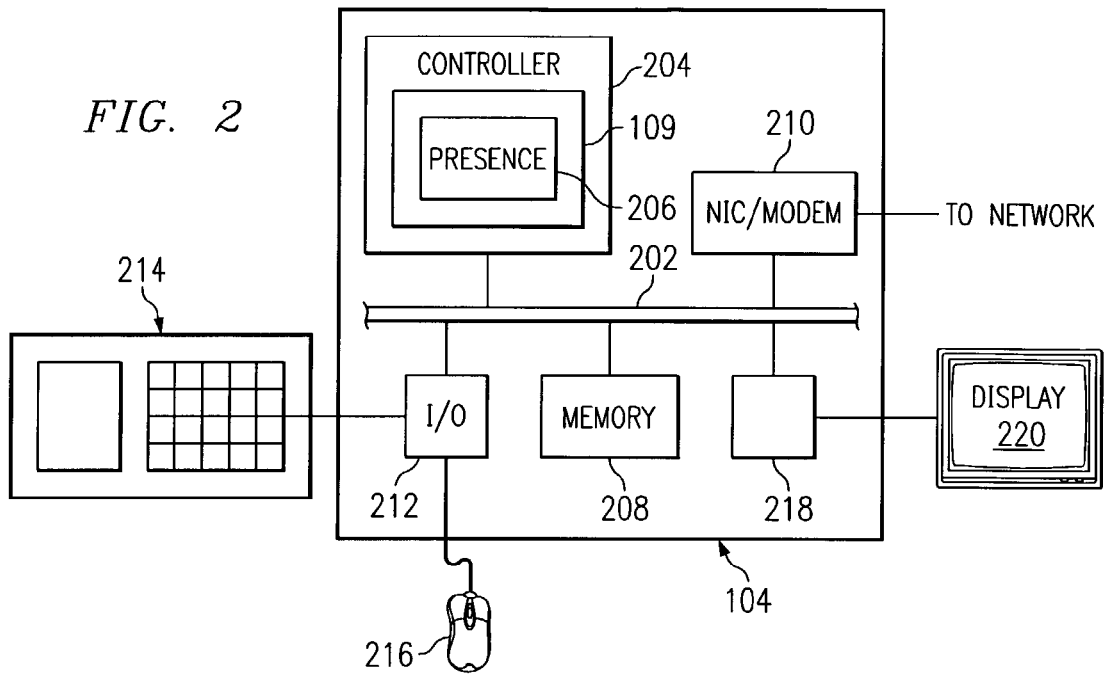
FIG. 2 is a block diagram of a network client according to an embodiment of the present invention.

FIG. 2 is a block diagram of an exemplary network client including a messaging client according to an embodiment of the invention. The network client 104 is representative of, for example, a personal computer equipped with electronic messaging client software. In the embodiment illustrated, the network client 104 includes a bus 202, to which are coupled a controller 204, such as one or more processors, a memory 208, a network interface card or modem 210 for coupling to the network, an input/output interface 212, and a display interface 218. The I/O interface couples to one or more I/O devices, such as a keyboard 214 and mouse or other cursor pointing device 216. The display interface 218 couples to a display 220, such as an LCD or CRT or other monitor for displaying a graphical user interface. The controller 204 implements an electronic messaging client 109 including presence client 206 according to the present invention.

Figure 3:
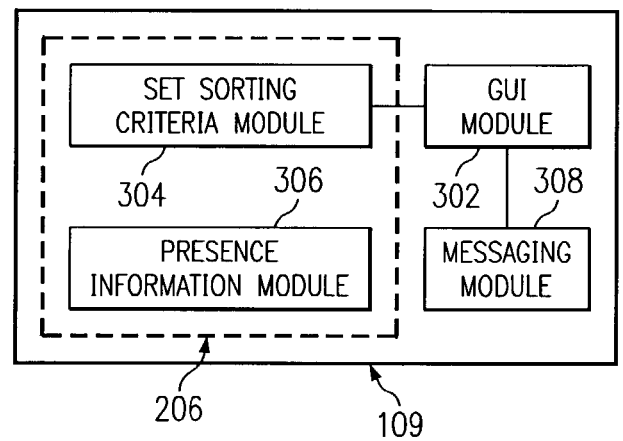
FIG. 3 is a block diagram of a messaging client according to an embodiment of the present invention.

More particularly, turning now to FIG. 3, a block diagram of an exemplary electronic or multimedia messaging client 109 according to an embodiment of the present invention is shown. It is noted that the electronic messaging client 109 is typically implemented as one or more software modules, implementable by the controller 204 and stored in memory 208. Further, it is noted that suitable electronic messaging clients may be implemented in Internet browsers or as Unified Multimedia Messaging packages or as standalone software packages.

As shown, the electronic messaging client 109 includes a GUI (graphical user interface) module 302 and a presence client module 206, as well as a messaging module 308. The GUI module 302 interacts with the personal computer Operating System to provide a user interface on display 220. As will be described in greater detail below, this allows the user to display presence information and sort messages according to presence criteria. The GUI module 302 further allows the user to compose and edit messages.

The Messaging Module 308 functions to receive composed messages and transmit them along with appropriate header and/or format information. Additionally, the Messaging Module 308 receives messages from other senders and decodes them for presentation to the GUI module 302.

The electronic messaging client 206 includes a Sorting Criteria Module 304 and a Presence Information Module 306.

As will be explained in greater detail below, the Sorting Criteria Module 304 is used by the electronic messaging recipient to sort his display according to the various presence criteria. The Presence Information Module 306 allows the sender to send presence information to the Presence Server 107a or, in certain embodiments, directly to other clients, and allows such presence information to be updated. In addition, the Presence Information Module 306 is used to access another client's Presence Server 107b. It is noted that, in certain embodiments, the Presence Information Module 306 may be embodied as a separate presence client, similar to those associated with Instant Messaging, for example. In addition, as will be explained in greater detail below, according to certain embodiments, the Presence Information Module 306 can be used to set a "key" that allows a recipient access to presence information according to predetermined criteria.

Figure 4:
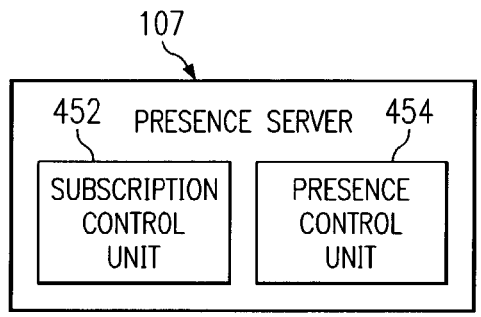
FIG. 4 is a block diagram of an exemplary presence server according to an embodiment of the present invention.

FIG. 4 is a block diagram of an exemplary Presence Server 107 according to an embodiment of the present invention. It is noted that, while illustrated as coupled to the gatekeeper 108 (FIG. 1), the Presence Server 107 could also be implemented as a standalone or incorporated into a Messaging Server (not shown) or other device attached to the network 101. As shown, the Presence Server 107 includes a Subscription Control Unit 452, and a Presence Control Unit 454. The Subscription Control Unit 452 and Presence Control Unit 454 may be implemented, for example, as software modules run or associated with any of a variety of microprocessors or microcontrollers.

As will be explained in greater detail below, the Subscription Control Unit 452 receives requests from messaging recipients and determines whether the message senders publish presence information to a presence server. The Presence Control Unit 454 receives or monitors presence information and provides it to the requesting client.

Operation of an embodiment of the present invention is explained by way of example. In particular, turning now to FIG. 5, a diagram of an exemplary Inbox window according to an embodiment of the present invention is shown. In particular, the inbox window 400a includes a sender field 402, a date field 404, a size field 406, and a subject field 408. Also shown are messages 410 (Microsoft), 412 (John Doe), 414 (Sandy Smith), 416 (Corporate Sales), 418 (ABC Company), and 420 (Sandy Smith). In the example of FIG. 5, the messages are sorted by the date field 404, though the messages may be sorted by other fields.

Turning now to FIG. 6, a diagram of an inbox window including a presence field is shown. As in the inbox window of FIG. 5, the inbox window 400b includes sender field 402, date field 404, size field 406, subject field 408, and presence field 403. In addition, in the example illustrated, the inbox window 400b includes messages 410 (Microsoft), 412 (John Doe), 414 (Sandy Smith), 416 (Corporate Sales), 418 (ABC Company), and 420 (Sandy Smith). The inbox window 400b also includes a message 417 (Bruce Wu).

As shown, the display of messages 412 (John Doe), 414 (Sandy Smith), 417 (Bruce Wu), and 420 (Sandy Smith) includes presence information, entered in presence field 403. As shown, message 412 (John Doe) includes an "On Phone" entry; message 414 and message 420 (Sandy Smith), indicates "Available," and message 417 (Bruce Wu) indicates "In Meeting." As will be explained in greater detail below, other presence information may be available. Furthermore, the entries in the presence field may have color coding or other indicia to uniquely identify the presence information. For example, a green indicator may be applied in the presence field of someone who was available; or a red indicator to one who is online but not available.

The presence information may be provided upon request of the recipient. Typically, only predetermined parties would have presence information applied. A selection of parties for whom presence information is provided may be settable by the user, subject to the sender also being subscribed to the service. For example, in the implementation illustrated, only presence information for John Doe, Bruce Wu, and Sandy Smith is provided. These parties may be part of a "buddy list" selectable by the user of the inbox. Methods of organizing such a buddy list are known. The presence information may be settable by the sender (Bruce Wu, Sandy Smith, John Doe), and sortable by the user of the inbox. It is noted that in other embodiments, all users of the system may have presence information automatically provided.

The type of presence information may be settable, as may be the ordering of the presence states. For example, the table below shows an exemplary availability table. It is noted that more or fewer states, and the level of information may be less or greater, that are shown.

| Order | Presence State |
|---|---|
| 1 | Available |
| 2 | Available on cell phone |
| 3 | At my desk |
| 4 | On phone |
| 5 | At lunch |
| 6 | In meeting |
| 7 | Not in the office |
| 8 | On vacation |
| 9 | Unavailable |

FIG. 7 illustrates an inbox window in which a user employs the availability table above for sorting the inbox by presence. Shown are sender field 402, presence field 403, date field 404, size field 406, and subject field 408. In addition, the messages that have presence information provided are ranked according to the table above. Thus, messages in which the user is available are ranked higher than those for which the user in on the phone or in meeting.

More particularly, in the example described above with reference to FIG. 6, the messages 412 (John Doe), 414 (Sandy Smith), 417 (Bruce Wu), and 420 (Sandy Smith) include presence information, entered in presence field 403. As shown, message 412 (John Doe) includes an "On Phone" entry; message 414 and message 420 (Sandy Smith), indicates "Available," and message 417 (Bruce Wu) indicates "In Meeting." Since the messages are sorted according to the table above, the messages are ordered as message 414, message 420 (Sandy Smith); message 412 (John Doe); message 417 (Bruce Wu); message 410 (Microsoft); message 416 (Corporate Sales); and message 418 (ABC Company).

Figures 8, 9:
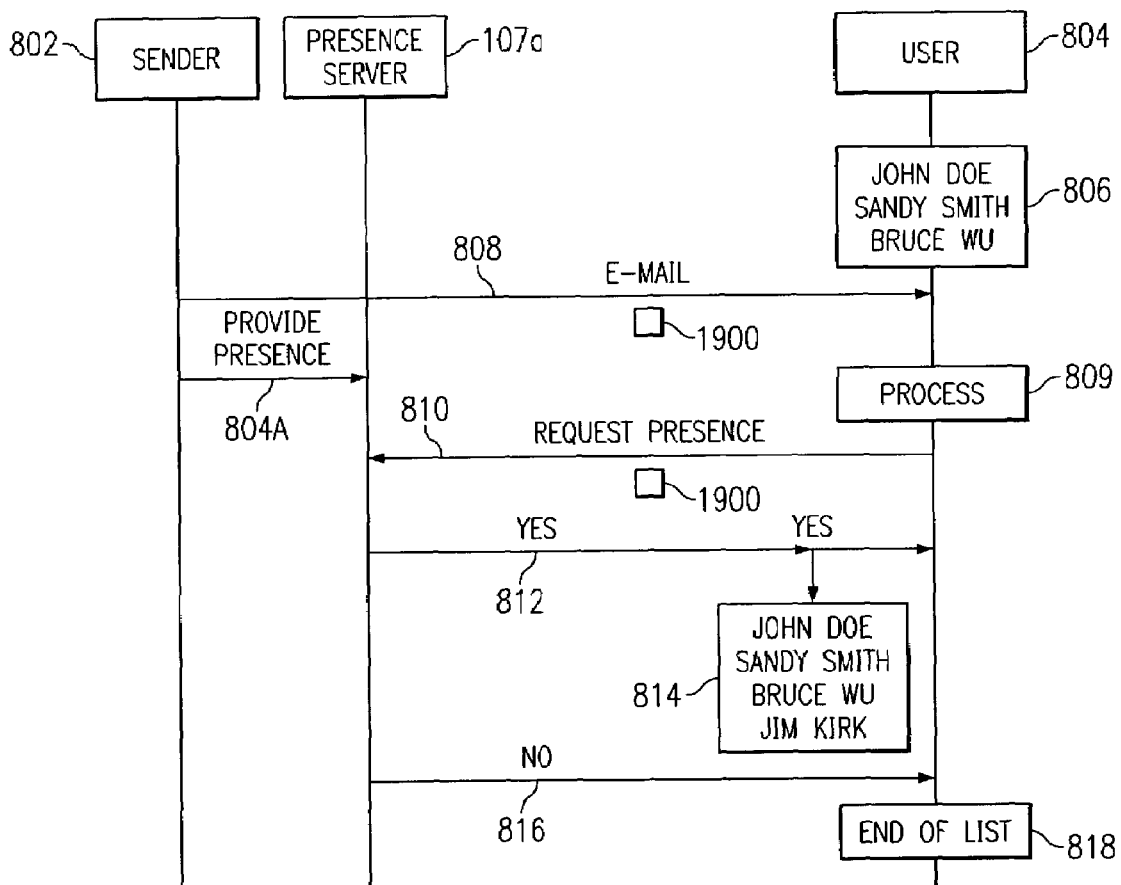
FIG. 8 is a diagram of an exemplary inbox screen according to an embodiment of the present invention.
FIG. 9 is a diagram illustrating operation of an embodiment of the present invention.

As shown, multiple messages from a same sender (e.g., Sandy Smith) are grouped together but the presence information is listed individually. In certain embodiments, however, the presence information may be consolidated and present a single presence indicator for the particular sender. FIG. 8 shows this for the example of FIG. 7. As shown in FIG. 8, the presence information for Sandy Smith, messages 414, 420, has been consolidated into a single presence field 702. This consolidation can provide an additional visual cue to help the user organize the processing of his or her mailbox.

As noted above, one aspect of the present invention relates to determining whether presence information is to be provided, such as through use of a "buddy list" of those for whom presence information is to be provided. According to one embodiment of the present invention, a message sender may be automatically added to a buddy list, i.e., may be automatically subscribed to the presence service upon receipt of an electronic message, which allows the recipient to access the sender's presence information. An illustration of such an embodiment is shown in FIG. 9.

Shown are a sender 802, a user 804 and also Presence Server 107a. The user 804 maintains a buddy list 806, with John Doe, Sandy Smith, and Bruce Wu being listed. The buddy list 806 may be maintained locally at user 804 or stored on the Presence Server 107, using the using the Subscription Control Unit 452. In 808, the sender 802 sends user 804 an electronic messaging message. In certain embodiments, the electronic message may include a token or key 1900 which allows the user access to the presence information. At 808a, if the sender wishes, the sender 802 sends presence information to the Presence Server 107a, i.e., registers as present with the Presence Server 107a. Sending the presence information may occur at any time.

At 809, the user 804 processes the message, e.g., for display and to extract size, sender, subject, and other miscellaneous information. The user 804 may then send a message to the Presence Server 107a, at 810, requesting presence information. The communication may be a one-time request or may be a request to add sender 802 to user 804's buddy list. It is noted, however, that in certain embodiments, adding sender 802 to the user's buddy list is automatic. Further, in certain embodiments, the communication also includes the key 1900, which allows the user access to the presence information for a predetermined period.

The Subscription Control Unit 452 of the Presence Server 107a processes the request according to predetermined criteria and the Presence Control Unit 454 can respond with a YES 812 or NO 816. If the Presence Control Unit 454 responds with a YES, then the user 804 updates its buddy list (or adds the sender to another such list) to allow access to presence information or, otherwise is allowed to receive presence information at 814. The sender 802's message can then be displayed in the inbox in the manner described above, with the presence information provided (typically accompanying the YES response). If NO, or if no response is received within a predetermined period, then the sender's message is placed at the bottom of the inbox, at 818. It is noted that in certain embodiments, the presence processing may be handled in a similar manner directly by the user 802 without a presence server.

The Presence handling of the key 1900 (FIG. 9) according to certain embodiments is illustrated in FIG. 10. At 1002, the Presence Server's Subscription Control Unit 452 receives a presence request and, at 1004, receives the key 1900. The key 1900 includes information identifying the sender, the recipient, and one or more presence criteria, such as a predetermined duration of presence availability. At 1006, the Subscription Control Unit 452 reads the key information and compares it to a stored authorization list (not shown) or other authorization criteria, typically provided by the sender. In 1008, the Subscription Control Unit 452 determines if the key is valid. If the key 1900 is not valid, then in 1010, the request for presence information is rejected or ignored. If the key 1900 is valid, then in 1012, the Presence Control Unit 454 will provide presence information to the recipient (for the predetermined period identified in the key).

While in certain embodiments, a presence indicator may be provided for each of a sender's electronic messaging aliases, other embodiments of the present invention allow the user to configure a single presence feature for multiple electronic messaging aliases. That is, the user can specify a list of electronic messaging addresses to be associated with each contact on the buddy list. This allows a single presence indicator to be provided over the multiple aliases. This is more particularly illustrated with reference to FIG. 11A and FIG. 11B.

In particular, FIG. 11A illustrates an exemplary buddy list 900, including entries for John Doe 902, Sandy Smith 904, and Bruce Wu 906. The entry for John Doe 902 includes a home entry 902*a* and a work entry 902*b*. Either by user selection or automatically, the system can be configured to provide a single presence indication for both addresses. For example, shown in FIG. 11B is an exemplary selection window for common presence indicia. The user can "click" on or otherwise select for presence information to be displayed, such as by clicking on the buttons in the column 905. The user can select for a common presence indicia to be provided by clicking on the buttons in the column 907.

Thus, shown in FIG. 11C is an exemplary inbox with the common presence information for John Doe's work and home addresses. More particularly, shown is inbox 950, with sender field 1002, presence field 1003, date field 1004, size field 1006, and subject field 1008. As shown, the inbox 950 includes Sandy Smith messages 1010 and presence information indicating Available, and a Bruce Wu message 1012 indicating In Meeting. Also shown are John Doe messages 1014, 1015, and 1016. In the example shown, messages 1014 and 1015 are from the home electronic messaging, while message 1016 is from the Work electronic messaging.

The invention described in the above detailed description is not intended to be limited to the specific form set forth herein, but is intended to cover such alternatives, modifications and equivalents as can reasonably be included within the spirit and scope of the appended claims.

What is claimed is:

1. A telecommunications system, comprising:
   a network;
   a plurality of network messaging clients;
   wherein at least one of said plurality of network clients is adapted to provide presence information to others of said plurality of network clients via an e-mail message, the e-mail message including a key allowing access to presence information according to predetermined criteria, the key including a predetermined period of access by which a recipient of the e-mail may be authorized to receive presence information regarding a sender of the e-mail in response to a presence server determining that the key is valid.

2. A telecommunications system in accordance with claim 1, wherein an other of said plurality of network clients comprises a recipient of an e-mail message, said e-mail message containing presence information from said one of said plurality of network clients.

3. A telecommunications system in accordance with claim 1, wherein an other of said plurality of network clients comprises a recipient of an e-mail message, and is adapted to request presence information.

4. A telecommunications system in accordance with claim 3, wherein said other of said network clients is adapted to format a message folder based on said presence information.

5. A telecommunications system in accordance with claim 4, wherein said message folder provides a single presence indicia for multiple messages received from said one.

6. A telecommunications system in accordance with claim 5, wherein said message folder provides a single presence indicia for multiple messages received from said one using multiple aliases.

7. An electronic messaging device, comprising:
   a processing system including a storage medium containing computer executable components of:
      a graphical user interface module;
      a sorting criteria module for setting presence sorting criteria on a display controlled via said GUI module; and
      a presence information module for providing presence information to other electronic messaging devices, the providing including via e-mail including a key allowing access to presence information according to predetermined criteria, the key including a predetermined period of access by which a recipient of the e-mail may be authorized to receive presence information regarding a sender of the e-mail in response to a presence server determining that the key is valid.

8. An electronic messaging device in accordance with claim 7, said presence information module adapted to provide said presence information to a presence server.

9. An electronic messaging device in accordance with claim 7, wherein said presence information module is adapted to provide said presence information in to another of said electronic messaging devices.

10. An electronic messaging device in accordance with claim 9, said sorting criteria module adapted to maintain a buddy list of parties for whom presence information is displayed via said graphical user interface module.

11. An electronic messaging device in accordance with claim 10, said sorting criteria module adapted to provide a single presence indicia for multiple messages from a same party.

12. An electronic messaging device in accordance with claim 11, said sorting criteria module adapted to provide a single presence indicia for multiple messages from a same party, said multiple messages having multiple aliases.

13. A telecommunications method, comprising:
   in a first network client,
      providing presence information associated with an e-mail message, the e-mail message including a key allowing access to presence information according to predetermined criteria, the key including a predetermined period of access by which a recipient of the e-mail message may be authorized to receive presence information regarding a sender of the e-mail in response to a presence server determining that the key is valid;
   in a second network client,
      formatting an e-mail message folder based on said presence information; and
      displaying said e-mail message folder with said presence information.

14. A telecommunications method in accordance with claim 13, wherein presence information is provided subsequent to sending an e-mail message with which said presence information is associated.

15. A telecommunications method in accordance with claim 14, wherein a single presence indicia is provided for multiple messages received from a same party.

16. A telecommunications method in accordance with claim 15, wherein a single presence indicia is provided for multiple message having different aliases from a same party.

17. A telecommunications method, comprising:
   providing a network;
   providing a plurality of network messaging client devices;
   wherein at least one of said plurality of network messaging client devices is adapted to provide presence information to others of said plurality of network messaging client devices in conjunction with an e-mail message, the e-mail message including a key allowing access to presence information according to predetermined criteria, the key including a predetermined period of access by which a recipient client device of the e-mail message may be authorized to receive presence information regarding a sender of the e-mail message in response to a presence server determining that the key is valid;

wherein another of said plurality of network client devices comprises a recipient device of an e-mail message and is adapted to request presence information from a presence information providing device upon receipt of said e-mail message, and to format and display an e-mail message folder based on said presence information.

18. A telecommunications method in accordance with claim 17, wherein said message folder provides a single presence indicia for multiple messages received from said one.

19. A telecommunications method in accordance with claim 17, wherein said message folder provides a single presence indicia for multiple messages received from said one using multiple aliases.

* * * * *